(12) United States Patent
Mertens

(10) Patent No.: US 7,995,793 B2
(45) Date of Patent: Aug. 9, 2011

(54) OCCLUSION DETECTOR FOR AND METHOD OF DETECTING OCCLUSION AREAS

(75) Inventor: Mark Jozef Willem Mertens, Eindhoven (NL)

(73) Assignee: Trident Microsystems (Far East) Ltd., Grand Cayman (KY)

(*) Notice: Subject to any disclaimer, the term of this patent is extended or adjusted under 35 U.S.C. 154(b) by 1416 days.

(21) Appl. No.: 10/494,503

(22) PCT Filed: Oct. 24, 2002

(86) PCT No.: PCT/IB02/04448
§ 371 (c)(1),
(2), (4) Date: May 4, 2004

(87) PCT Pub. No.: WO03/041416
PCT Pub. Date: May 15, 2003

(65) Prior Publication Data
US 2004/0252763 A1    Dec. 16, 2004

(30) Foreign Application Priority Data

Nov. 7, 2001 (EP) .................................... 01204272

(51) Int. Cl.
*G06K 9/00*    (2006.01)
(52) U.S. Cl. ......................... 382/103; 382/118; 382/143
(58) Field of Classification Search .................. 348/699, 348/402.1, 407.1, 413.1; 375/240.16; 382/103, 382/118, 143, 159, 160, 276, 236
See application file for complete search history.

(56) References Cited

U.S. PATENT DOCUMENTS

| 5,262,856 | A |   | 11/1993 | Lippman et al. |
|---|---|---|---|---|
| 5,337,154 | A | * | 8/1994 | Dorricott et al. ............... 348/448 |
| 5,442,407 | A |   | 8/1995 | Iu |
| 5,471,252 | A | * | 11/1995 | Iu ................................. 348/699 |

(Continued)

FOREIGN PATENT DOCUMENTS

EP    0395246    4/1990

(Continued)

OTHER PUBLICATIONS

De Haan G. et al: "True Motion Estimation with 3-D Recursive Search Block Matching", IEEE Transactions on circuits and systems for video technology, vol. 3, No. 5, Oct. 1993, pp. 368-379.

(Continued)

*Primary Examiner* — Wesley Tucker
*Assistant Examiner* — Aklilu k Woldemariam
(74) *Attorney, Agent, or Firm* — DLA Piper LLP (US)

(57) ABSTRACT

An occlusion detector (200, 201, 203, 205, 207) for detecting occlusion areas (108, 110) in an image (100) comprises a motion vector selector (202) for selecting at least two motion vectors (118, 120) from a set of motion vectors. It further comprises a pixel value comparator (206) for calculating a first and a second pixel value difference between a particular value of a particular pixel (112) of the image (100) and a second value of a second pixel (116) and a third value of a third pixel (114), both of a further image (102). The occlusion detector (200, 201, 203, 205, 207) further comprises a decision unit (204) for deciding whether the particular pixel (112) belongs to one of the occlusion areas (108, 110) by checking whether the first and second pixel value differences are larger than a first predetermined threshold and a second predetermined threshold, respectively.

9 Claims, 5 Drawing Sheets

U.S. PATENT DOCUMENTS

| | | | |
|---|---|---|---|
| 5,500,685 A | | 3/1996 | Kokaram |
| 5,500,689 A | | 3/1996 | Kokaram |
| 5,568,196 A | | 10/1996 | Hamada et al. |
| 5,612,745 A | | 3/1997 | Ozcelik et al. |
| 5,973,754 A | * | 10/1999 | Panis .......................... 348/699 |
| 5,990,941 A | | 11/1999 | Jackson et al. |
| 6,111,582 A | * | 8/2000 | Jenkins ........................ 345/421 |
| 6,219,436 B1 | | 4/2001 | De Haan et al. |
| 6,298,144 B1 | * | 10/2001 | Pucker et al. ................. 382/103 |
| 6,480,615 B1 | * | 11/2002 | Sun et al. ..................... 382/103 |
| 6,628,715 B1 | * | 9/2003 | Iu et al. .................... 375/240.16 |
| 6,674,877 B1 | * | 1/2004 | Jojic et al. .................... 382/103 |
| 6,771,799 B2 | | 8/2004 | Mertens et al. |
| 6,810,081 B2 | * | 10/2004 | Dantwala ................ 375/240.16 |
| 7,010,039 B2 | * | 3/2006 | De Haan et al. ......... 375/240.16 |
| 7,010,042 B2 | * | 3/2006 | Vissers et al. ............ 375/240.16 |
| 2004/0017930 A1 | * | 1/2004 | Kim et al. .................... 382/103 |

FOREIGN PATENT DOCUMENTS

| | | | |
|---|---|---|---|
| WO | WO 92/05662 | | 4/1992 |
| WO | WO 99/22520 | | 5/1999 |
| WO | WO0011863 | | 3/2000 |
| WO | WO 01/89225 | | 11/2001 |
| WO | WO03041416 | | 5/2003 |
| WO | WO 2005081524 A1 | * | 9/2005 |

OTHER PUBLICATIONS

De Haan G. et al: True Motion Estimation with IEEE Transactions on circuits and systems for video technology, vol. 3, No. 5, Oct. 1993, pp. 368-379.

Gao D. et al.: "A novel algorithm for adaptive background estimation", Proceedings ICIP 2001, pp. 395-398.

Depommier, R. et al.: "Motion estimation with detection of occlusion areas", Digital Signal Processing 2, Estimation, VLSI. San Francisco, Mar. 23-26, 1992, IEEE International Conference on Acoustics, Speech and Signal Processing Conference Proceedings, vol. 5, Conf. 17, pp. 269-272, XP010058934, ISBN: 0-7803-0532-9, pp. III-270, paragraph 2.

Ozcelik et al: "Detection and encoding of occluded areas in very low bit rate video coding", 1996 IEEE International Conference on Acoustics, Speech and Signal Processing Conference Proceedings (CAT. No. 96CH35903), 1996 IEEE International Conference on Acoustics, Speech and Signal Processing Conference Proceedings, Atlanta, GA, USA 7-10M, pp. 2068-2071 vol. 4 XP002090139 ISSBN 0-7803-3192-3, 1996, New York, NY, USA, IEEE, USA; p. 2069, paragraph 2.2—p. 2070, paragraph 3.

Robert, P.: "Motion compensating interpolation considering occluding, appearing and disappearing areas", Sep. 4, 1991, Signal Processing of HDTV, 3, Turin, Sep. 4-6 1991, Nr. Workshop 4, pp. 329-341, Yasuda H. Chiariglione L, XP000379970, p. 332, paragraph 3—p. 337, paragraph 5, figs. 2, 3, figs. 1, 2.

Thoma, R. et al.: "Motion compensating interpolation considering covered and uncovered background", Signal Processing. Image Communication, vol. 1, No. 2, Oct. 1, 1989, pp. 191-212, XP000234868, p. 204, paragraph 5.3 p. 209, paragraph 8, fig. 10, figs. 9, 10.

M. Mertens and G. de Haan: Motion vector field improvement for picture rate upconvension with reduced halo, Proceedings of SPIE/IST VCIP conference, San Jose 2001, pp. 352-362.

* cited by examiner

OCCLUSION DETECTOR FOR AND METHOD OF DETECTING OCCLUSION AREAS

This application claims the priority benefits under 35 USC 119 of PCT International Application PCT/IB02/04448, filed Oct. 24, 2002, which claims the priority to and benefit under 35 USC 119 of European Patent Application No. 01204272.7 filed on Nov. 7, 2001.

The invention relates to an occlusion detector for detecting occlusion areas in a first image based on a set of motion vectors, with the first image belonging to a series of consecutive images.

The invention further relates to a method of detecting occlusion areas in a first image based on a set of motion vectors with the first image belonging to a series of consecutive images.

The invention further relates to a motion estimator comprising:

a motion vector estimator for calculating a set of motion vectors;

an occlusion detector for detecting occlusion areas in a first image based on the set of motion vectors, with the first image belonging to a series of consecutive images; and a motion vector assigning unit for assigning a particular motion vector to a particular pixel on the basis of output of the occlusion detector.

The invention further relates to an image processing apparatus comprising:

receiving means for receiving a signal representing a first image to be displayed;

a motion estimator comprising an occlusion detector for detecting occlusion areas in the first image based on a set of motion vectors, with the first image belonging to a series of consecutive images; and a motion compensated image processing unit.

With occlusion area is meant, an area which corresponds with a portion of a scene being captured, that is visible in an image of a series of consecutive images but that is not visible in a next image or previous image. This is caused by the fact that foreground objects in the scene, which are located more close to the camera than background objects, can cover portions of the background objects. In the case of movement of e.g. the foreground objects some portions of the background objects get occluded, while other portions of the background objects get uncovered.

Occlusion areas can cause artifacts in temporal interpolations. E.g. in the case of up-conversion, occlusion areas can result in so-called halos. In that case motion vectors are estimated in order to calculate up-converted output images by means of temporal interpolations. For temporal interpolation a number of pixels, which preferably relate to one and the same object are taken from consecutive images. This can not be done straightforward in the case of occlusion areas, because no related pixels can be found in the consecutive images. Other interpolation strategies are required.

An embodiment of the occlusion detector of the kind described in the opening paragraph is known from WO0011863. The occlusion detector as specified in WO0011863 is designed to identify problem areas, i.e. occlusion areas in an image, on the basis of edges which are detected in a motion vector field being calculated for the image. The result however is very coarse. First the coarseness is due to the fact that although the position of the foreground object edge will usually be known, the extent of the halo region is not. Second, the motion vector field itself can be displaced. This displacement can even be so large that missing and spurious occlusion edges can occur.

It is a first object of the invention to provide an occlusion detector of the kind described in the opening paragraph being substantially pixel accurate.

It is a second object of the invention to provide a method of detecting occlusion areas, of the kind described in the opening paragraph which results in detected occlusion areas with a substantially pixel accuracy.

It is a third object of the invention to provide a motion estimator comprising an occlusion detector, of the kind described in the opening paragraph with the occlusion detector being substantially pixel accurate.

It is a fourth object of the invention to provide an image processing apparatus comprising a motion estimator comprising an occlusion detector, of the kind described in the opening paragraph with the occlusion detector being substantially pixel accurate.

The first object of the invention is achieved in that the occlusion detector comprises:

a motion vector selector for selecting a first motion vector and a second motion vector from the set of motion vectors, based on a substantial vector difference between the first motion vector and the second motion vector;

a pixel value comparator for calculating a first pixel value difference between a first value of a first pixel of a second image and a second value of a second pixel of a third image, with a first relation between the first pixel and the second pixel given by the first motion vector, and for calculating a second pixel value difference between a third value of a third pixel of the second image and a fourth value of a fourth pixel of the third image, with a second relation between the third pixel and the fourth pixel given by the second motion vector; and a decision unit for deciding whether a particular pixel of the first image, corresponding to an intersection of the first motion vector and the second motion vector, belongs to one of the occlusion areas by checking whether the first pixel value difference is larger than a first predetermined threshold and the second pixel value difference is larger than a second predetermined threshold.

In the field of motion estimation, very often a match criterion is based on minimizing a difference between values of corresponding pixels of successive images, with the relation between the corresponding pixels given by a motion vector. For calculating the differences a group of pixels of an image are compared with groups of pixels of a further image. Instead of minimizing a difference between values of pixels, the occlusion detector according to the invention determines whether the difference between pixel values is larger than predetermined thresholds, i.e. a first pixel value difference larger than a first predetermined threshold and a second pixel value difference larger than a second predetermined threshold. For an occlusion area it is not possible to directly calculate a correct motion vector by comparing groups of pixels of an image in which the area is occluded, i.e. covered, with groups of pixels of another image in which the area is not covered. In other words, it is not possible to match something which is visible in the image if it is not visible in the other image, and vice versa. Hence, the probability is high that a motion vector which is estimated for a group of pixels, partly or substantially corresponding to an occlusion area, is wrong. The occlusion detector according to the invention is designed to check for a particular pixel at least two estimated relevant motion vectors. A checking means is used to compare pixel value differences with predetermined thresholds. If the differences are larger than the thresholds, then it is assumed that the motion vectors are incorrect for the particular pixel and the particular pixel is labeled as being part of an occlusion area. The first predetermined, threshold and the second predetermined threshold can be mutually equal.

With the occlusion detector according to the invention it is possible to detect occlusion areas in images which are calculated or to be calculated by means of temporal interpolation based on images acquired by a camera. E.g. the second image is acquired first, followed by the third. The first image has to be calculated by means of temporal interpolation of the second and the third image. However, with the occlusion detector according to the invention it is also possible to detect occlusion areas in images which are acquired by a camera. In that case the first and second image are one and the same image and the particular pixel corresponds with the first pixel and the third pixel. Below this case will be used to explain the working of the occlusion detector according to the invention.

The working of the occlusion detector according to the invention can be illustrated by a simple example of a surveillance application. Suppose that an image shows a room with a person at a first location within the room and a next image shows the same room with the same person but at a second location. The camera which captured the two images did not move and the zoom was not adjusted in the time period of capturing the two images. In this case it is reasonable to assume that there are only two motion vectors applicable, i.e. the set of motion vectors comprises only two motion vectors: a background motion vector related to pixels of the room and a foreground motion vector related to pixels of the person. However for pixels located in occlusion areas none of these motion vectors is correct. Pixel value differences will be relatively large.

In the example above it is assumed that there are only two motion vectors. Suppose however that there are, e.g. because of noise, multiple foreground motion vectors in the set of motion vectors. In that case the first and second motion vector must be selected by comparing vector differences, i.e. differences in length and direction between motion vectors of the set. It is preferred that these differences are relatively large in order to select the first and second motion vector. Otherwise two motion vectors might be selected which correspond to one object, e.g. the person in the example. It is preferred that the first motion vector corresponds to an object located in front of the background and that the second motion vector corresponds to the background, or vice versa.

A major advantage of the occlusion detector according to the invention is that it enables pixel accurate halo reduction in up-conversion. However it is also interesting to detect occlusion areas in order to control image enhancement. E.g. to decrease the level of image enhancement in areas where occlusions are detected.

In an embodiment of the occlusion detector according to the invention the motion vector selector is designed to select the first motion vector based on a distance between the particular pixel and a further pixel that belongs to a particular group of pixels to which the first motion vector corresponds. The pixels of a group may form a block of pixels or they may correspond to an arbitrary shaped object. In the example above with the room and the person, the set of motion vectors has two elements, i.e. has two motion vectors. However if the set of motion vectors has more than two motion vectors it is important to have a criterion for the selection of the first and second motion vector. The spatial distance between the particular pixel and the further pixel is such criterion. A relatively small spatial distance between the particular pixel and the further pixel means that the motion vector, which corresponds to the particular group of pixels to which the further pixel belongs, is relevant. Preferably motion vectors are selected from groups of pixels which are neighbors of the group of pixels to which the particular pixel belongs. Also the motion vector of the group of pixels to which the particular pixel belongs, is a good candidate for selection.

In an embodiment of the occlusion detector according to the invention the motion vector selector is designed to determine frequencies of occurrence for motion vectors of the set of motion vectors and to select the first motion vector on the basis of the frequencies of the occurrence. A criterion for selecting the first motion vector and the second motion vector is the frequency of occurrence. If for relatively many groups of pixels of an image, motion vectors have been estimated with particular values, i.e. length and direction, then the probability is relatively high that such a motion vector is relevant and should be selected. It is possible to determine a histogram of motion vectors of an image or a histogram of motion vectors of a portion of the image. In the latter case it is preferred that the portion of the image is located in the neighborhood of the particular pixel.

In an embodiment of the occlusion detector according to the invention the pixel value comparator is designed to calculate an absolute difference between the first value and the second value. It is also possible to calculate e.g. a square difference. The advantage of calculating an absolute difference is that it is relatively computation friendly.

In an embodiment of the occlusion detector according to the invention the motion vector selector is designed to select the first motion vector from the set of motion vectors, with the set comprising motion vectors estimated for respective groups of pixels of the first image and the third image. The set of motion vectors might comprises motion vectors which have been estimated for groups of pixels of the first image. However the set of motion vectors might also comprise motion vectors estimated for groups of pixels of other images, e.g. the third image.

In an embodiment of the occlusion detector according to the invention the occlusion detector comprises a measurement unit to determine the first predetermined threshold. The advantage of this embodiment is that the detection of occlusions can be adjusted to the image content.

Modifications of the occlusion detector and variations thereof may correspond to modifications and variations thereof of the motion estimator, of the method of detecting occlusion areas, and of the image processing apparatus described. The image processing apparatus may comprise additional components, e.g. a display device for displaying the processed images. The motion compensated image processing unit might support one or more of the following types of image processing:

De-interlacing: Interlacing is the common video broadcast procedure for transmitting the odd and even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction. This can also involve spatial processing, resulting in spatial-temporal noise reduction.

High quality motion vectors and occlusion detection are also important in the field of image compression. Hence detecting occlusion areas is also relevant for image compression applications.

These and other aspects of the occlusion detector, of the motion estimator, of the method of detecting occlusion areas and of the image display apparatus according to the invention will become apparent from and will be elucidated with respect to the implementations and embodiments described hereinafter and with reference to the accompanying drawings, wherein.

Figure 2A:
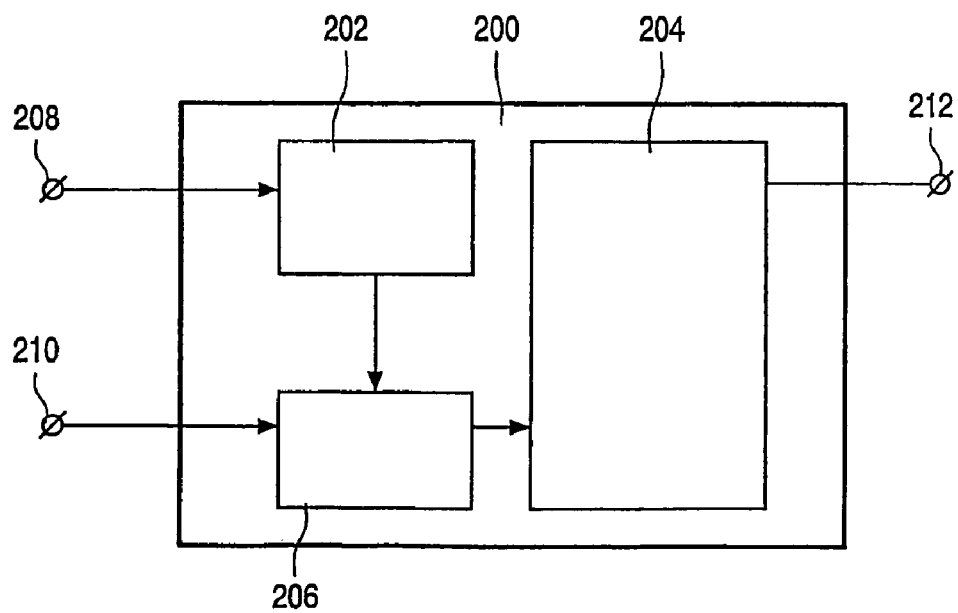
Figure 2B:
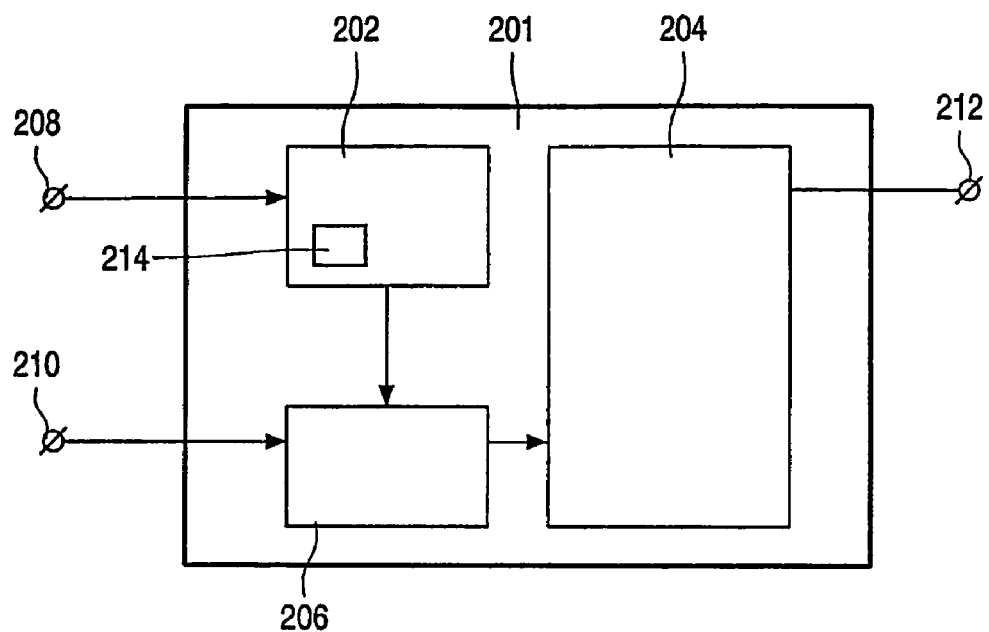
Figure 2C:
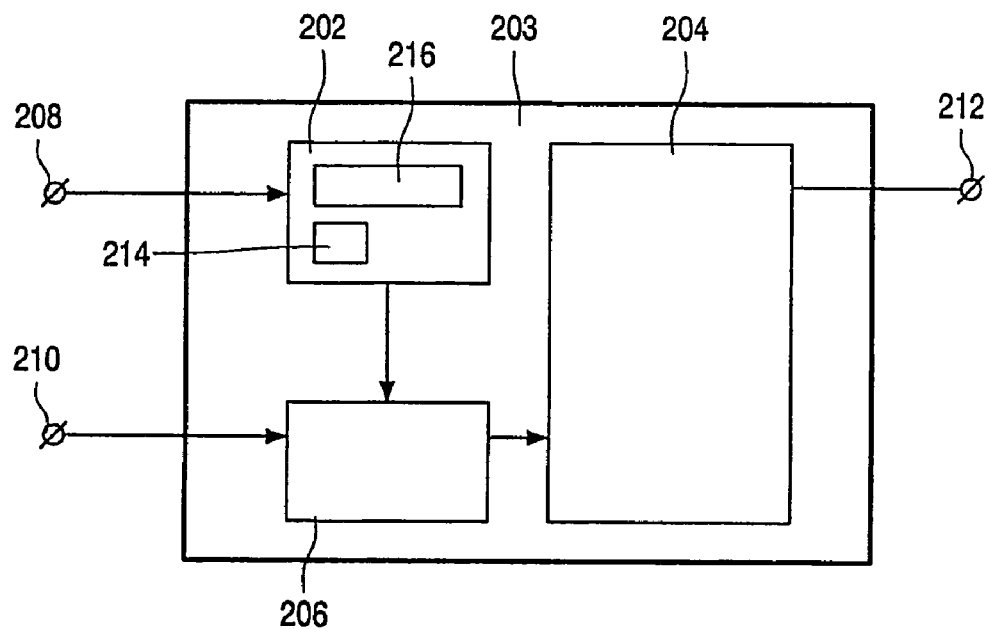
Figure 2D:
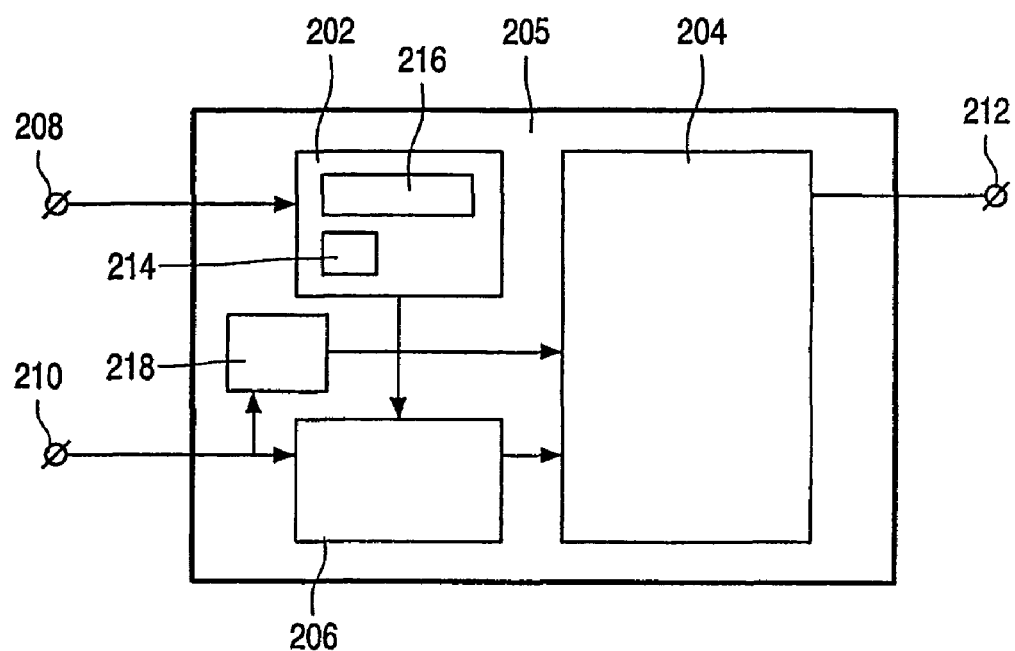
Figure 2E:
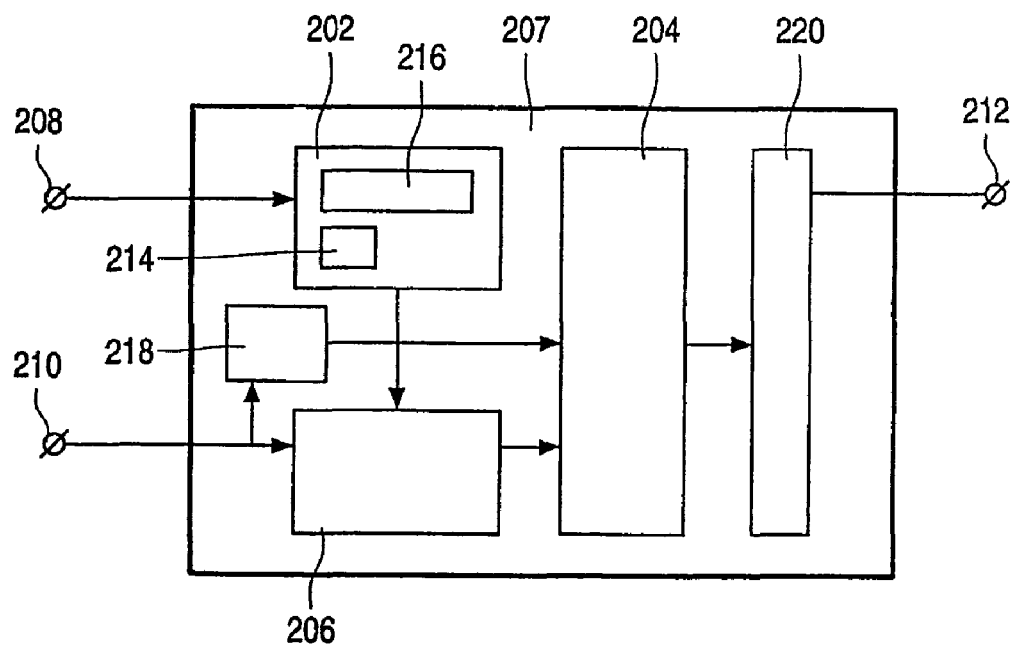
Figure 3:
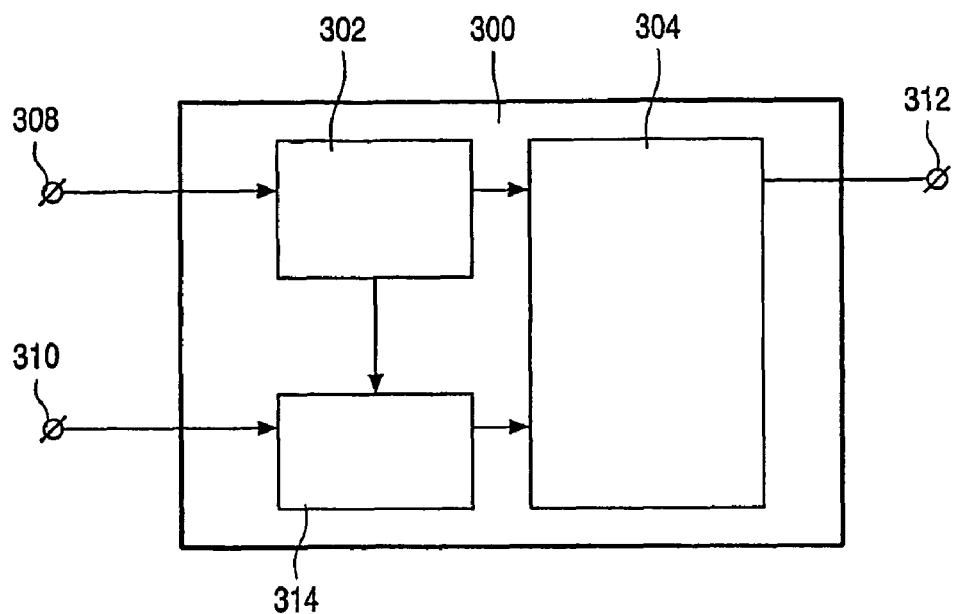

FIG. 2A schematically shows an embodiment of the occlusion detector;

FIG. 2B schematically shows an embodiment of the occlusion detector comprising means for calculating distances between pixels;

FIG. 2C schematically shows an embodiment of the occlusion detector comprising means for calculating frequencies of occurrences of motion vectors;

FIG. 2D schematically shows an embodiment of the occlusion detector comprising a measurement unit to determine the first predetermined threshold;

FIG. 2E schematically shows an embodiment of the occlusion detector comprising a gap-closing filter;

FIG. 3 schematically shows an embodiment of the motion estimator; and

Figure 4:
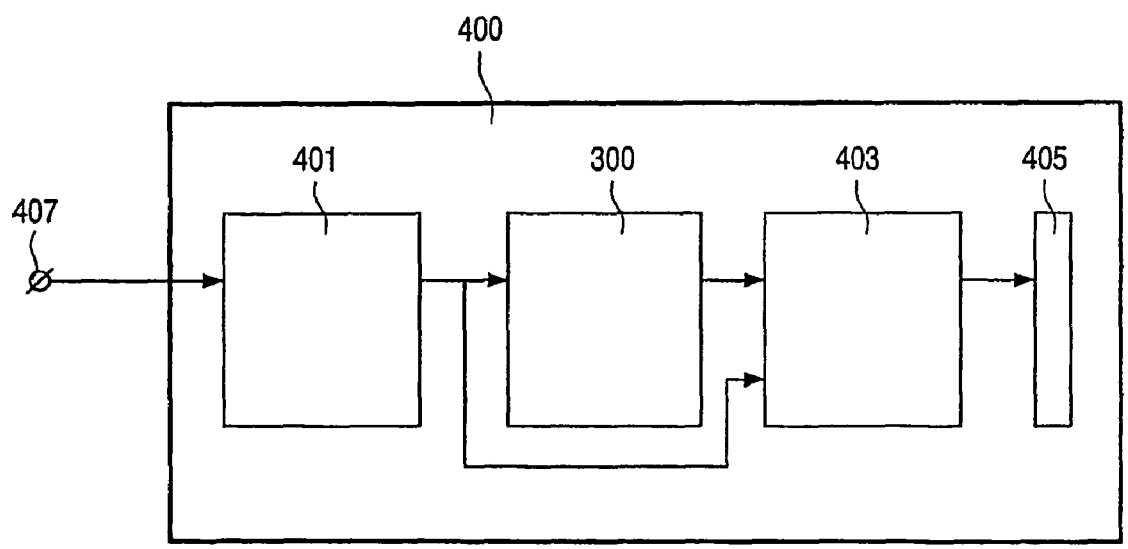

FIG. 4 schematically shows an embodiment of the image processing apparatus. Corresponding reference numerals have the same meaning in all of the Figs.

Figure 1A:
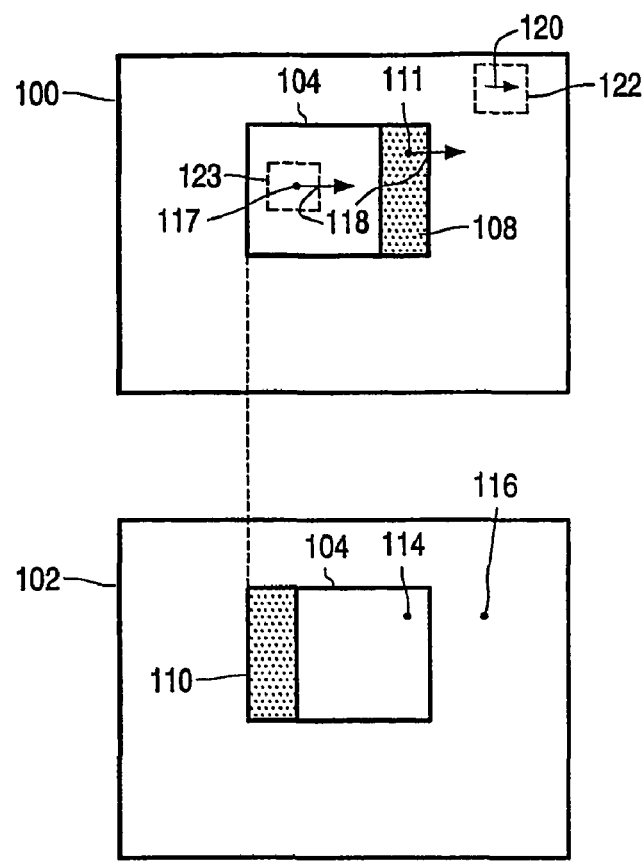
FIG. 1A shows two images with occlusion areas in order to schematically illustrate the working of an occlusion detector according to the invention.

FIG. 1A shows two images 100, 102 with occlusion areas 108, 110 in order to schematically illustrate the working of the occlusion detector 200 according to the invention. An image 100 shows a room with a person 104 at a first location within the room and the other image 102 shows the same room with the same person 104 but at a second location. The camera which captured the two images 100, 102 did not move and the zoom was not adjusted. There are only two motion vectors 118, 120 applicable, i.e. the set of motion vectors comprises only two motion vectors: a background motion vector 120 related to pixels of the room and a foreground motion vector 118 related to pixels of the person 104. To calculate the background motion vector 120 a group of pixels 122 is used. Notice that the length of the depicted arrow does not have a relation with the length of the background motion vector 120, which is equal to zero. For pixels located in occlusion areas 108, 110 none of these motion vectors 118, 120 is correct. This is concluded after the following test has been performed. First, the difference between the luminance value of pixel 111 and the luminance value of pixel 114 is compared with the first predetermined threshold. The pixel coordinates of the pixels 111 and 114 are mutually equal, because the applied motion vector is the background motion vector 120, which equals zero. The probability is high that the luminance difference is larger than the first predetermined threshold: pixel 111 belongs to the room and pixel 114 belongs to the person 104. Second, the difference between the luminance value of pixel 111 and the luminance value of pixel 116 is compared with the second predetermined threshold. The pixel coordinates of the pixels 111 and 116 are different: the applied motion vector is the foreground motion vector 118, which is related to the spatial distance between the first and second location of the person. The probability is high that this luminance difference is larger than the second predetermined threshold: pixel 111 belongs to the room and pixel 116 belongs to another part of the room. Based on these comparisons it is assumed that pixel 111 is located in an occlusion area. The first predetermined threshold and the second predetermined threshold can be mutually equal.

Figure 1B:
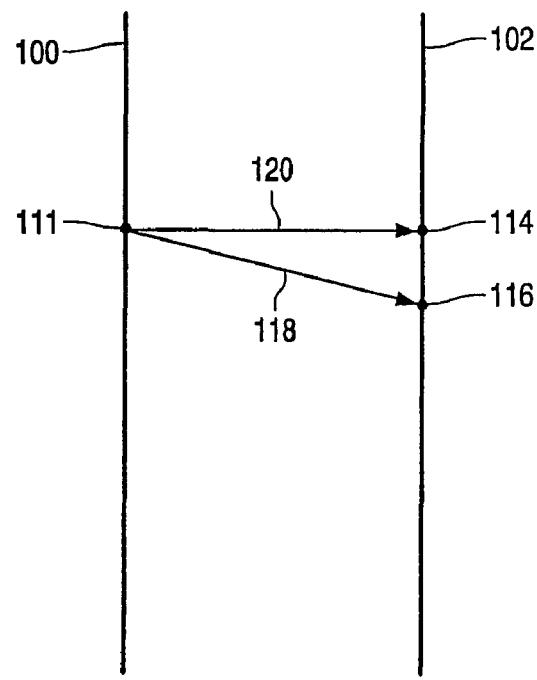
FIG. 1B shows the 1-Dimensional relation between indicated motion vectors and pixels from FIG. 1A.
Figure 1C:
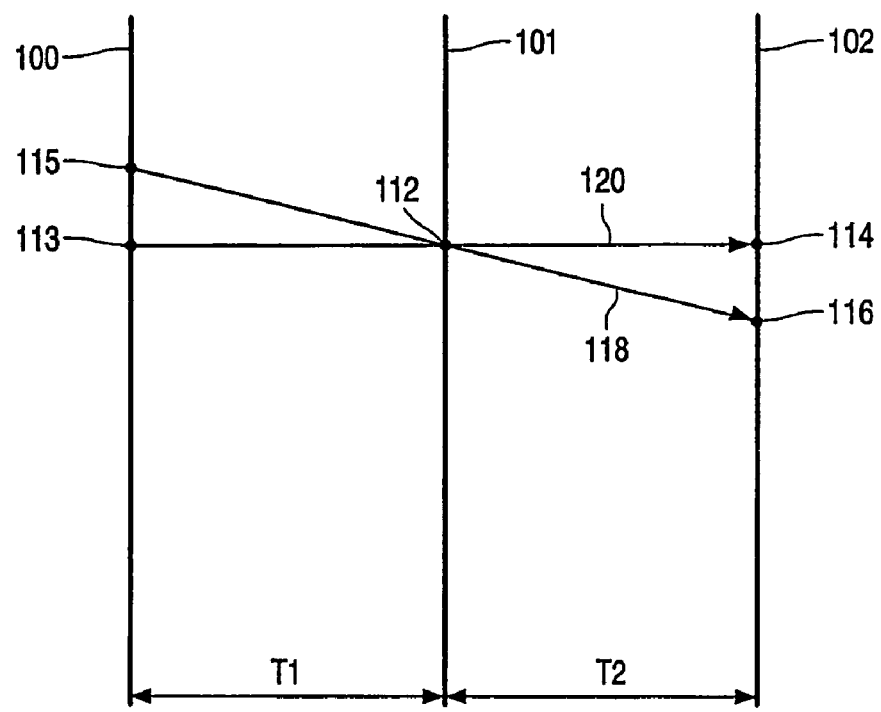
FIG. 1C shows the 1-Dimensional relation between motion vectors and pixels in case of three images.

FIG. 1B shows the 1-Dimensional relation between indicated motion vectors 118, 120 and pixels 111, 114 and 116 from FIG. 1A. FIG. 1C shows the 1-Dimensional relation between motion vectors 118, 120 and pixels 112-116 in case of three images 100, 101, 102, two captured images 100, 102 and one interpolated image 101. When comparing FIG. 1B with FIG. 1C it becomes clear that the example described in connection with FIG. 1A is a special case: the first image 101 and the second image 100 are one and the same; the pixels 111, 113 and 115 are also one and the same pixel. In FIG. 2A an occlusion detector 200 is described which also works for such case.

In FIG. 1C the relations between pixels from subsequent images is schematically illustrated. It corresponds with the case of up-conversion: an interpolated image 101 is being calculated by means of temporal interpolation based on at least two original images 100, 102. An occlusion detector 200 according to the invention is designed to determine for pixels of such an interpolated image 101 whether they are located in an occlusion area. The occlusion detector 200 comprises:

a motion vector selector 202 for selecting a first motion vector 118 and a second motion vector 120 from the set of motion vectors, based on a substantial vector difference between the first motion vector 118 and the second motion vector 120;

a pixel value comparator 206 for calculating a first pixel value difference between a first value of a first pixel 115 of the first original image 100 and a second value of a second pixel 116 of the second original image 102, with a first motion vector 118 from the first pixel 115 to the second pixel 116, and for calculating a second pixel value difference between a third value of a third pixel 113 of the first original image 100 and a fourth value of a fourth pixel 114 of the second original image 102, with the second motion vector 120 from the third pixel 113 to the fourth pixel 114; and a decision unit 204 for deciding whether a particular pixel 112 of the interpolated image 101, corresponding to an intersection of the first motion vector 118 and the second motion vector 120, belongs to one of the occlusion areas by checking whether the first pixel value difference is larger than a first predetermined threshold and the second pixel value difference is larger than a second predetermined threshold.

The relations between the pixels 112-116 are given by the first motion vector 118 and the second motion vector 120. The time difference T1 between the first original image 100 and the interpolated image 101, and the time difference T2 between the second original image 102 and the interpolated image 101 are very important. E.g. the first motion vector 118 indicates the vertical $V_y(T1+T2)$ and horizontal offset $V_x(T1+T2)$ between a picture element of the first original image 100 and the second original image 102, i.e. the movement during a time T1+T2. Suppose T1=T2. Then the vertical $V_y(T1)$ and horizontal offset $V_x(T1)$ between a picture element of the first original image 100 and the interpolated image 101 can be calculated easily: $V_y(T1)=V_y(T1+T2)/2$; $V_x(T1)=V_x(T1+T2)/2$. For other values of T1 and T2 similar calculations can be performed. Hence, given the coordinates of a pixel in an image, the coordinates of another pixel in another image can be calculated by means of a motion vector and time differences. This can be by directly applying a motion vector or by calculating partial offsets. For example:

by applying motion vector 118 on pixel 115 of the first original image 100, pixel 116 of the second original image 102 can be directly found;

by applying the inverse of motion vector 118 on pixel 116 of the second original image 102, pixel 115 of the first original image 100 can be directly found;

by calculating partial offsets based on motion vector 118 and time differences T1 and T2, pixel 115 in the first original image 100 can be calculated given pixel 112 of the interpolated image 101;

by calculating partial offsets based on motion vector 118 and time differences T1 and T2, pixel 116 in the second original image 102 can be calculated given pixel 112 of the interpolated image 101;

A motion vector can start from a pixel, end at or intersect the pixel. If two motion vectors start from a pixel or end at a pixel, this is also seen as an intersection. If the coordinates of the appropriate pixels have been calculated, the corresponding pixel values can be fetched in order to calculate a first pixel value difference and a second pixel value difference. Then these differences are compared with predetermined thresholds.

FIG. 2A schematically shows an embodiment of the occlusion detector 200 which comprises:

a motion vector selector 202 for selecting a first motion vector 118 and a second motion vector 120 from the set of motion vectors, based on a substantial vector difference between the first motion vector 118 and the second motion vector 120;

a pixel value comparator 206 for calculating a first pixel value difference between a particular value of a particular pixel 111 of an image 100 and a second value of a second pixel 116 of another image 102, with a first relation between the particular pixel 111 and the second pixel 116 given by the first motion vector 118, and for calculating a second pixel value difference between the particular value and a third value of a third pixel 114 of the other image 102, with a second relation between the particular pixel 111 and the third pixel 114 given by the second motion vector 120;

a decision unit 204 for deciding whether the particular pixel 111 belongs to one of the occlusion areas 108, 110 by checking whether the first pixel value difference is larger than a first predetermined threshold and the second pixel value difference is larger than a second predetermined threshold. Images, e.g. 100, 102 are provided at the first input connector 210. Motion vectors, e.g. 118, 120 are provided at the second input connector 208, by a motion estimator (See FIG. 3). A binary mask, indicating for each pixel of the image 100, whether it belongs to an occlusion area, e.g. 108, or whether it does not belong to such an occlusion area, is provided at the output connector 212, by the occlusion detector. The working of the occlusion detector 200 is as described in connection with FIG. 1A.

FIG. 2B schematically shows an embodiment of the occlusion detector 201 comprising means 214 for calculating distances between pixels. The motion vector selector 202 is designed to select the first motion vector 118 based on a distance between the particular pixel 111, 112 and a further pixel 117 that belongs to a particular group of pixels 123 to which the first motion vector 118 corresponds. Selecting the second motion vector 120 is done on a similar basis. If the provided set of motion vectors has several motion vectors it is important to have a criterion for the selection of the first motion vector 118 and second motion vector 120. The spatial distance between the particular pixel 111, 112 and the further pixel 117 is such criterion. A relatively small spatial distance between the particular pixel 111, 112 and the further pixel 117 means that the motion vector 118, which corresponds to the particular group of pixels 123, is relevant. Many motion estimators, e.g. 300, are block based. That means that the image 100 is divided in a number of blocks of e.g. 8×8 pixels. For each of these blocks, respective motion vectors are estimated. In the case that a block-based motion estimator provides the set of motion estimators to the occlusion detector 201 then the first motion vector 118 and/or the second motion vector 120 are selected from blocks which are neighbors of the block to which the particular pixel 111, 112 belongs. The probability is very high that the motion vector of the block to which the particular pixel 111, 112 belongs, is also selected.

FIG. 2C schematically shows an embodiment of the occlusion detector 203 comprising means 216 for calculating frequencies of occurrences of motion vectors, e.g. 118, 120. The occlusion detector 203 is designed to determine frequencies of occurrence for motion vectors of the set of motion vectors and to select the first motion vector 118 on the basis of the frequencies of the occurrence. Also the second motion vector 120 is selected on a similar basis. The means 216 for calculating frequencies of occurrences calculates a two dimensional motion vector histogram, with one dimension corresponding to translation in a first direction, e.g. horizontally and a the other dimension corresponding to translation in a second direction, cross to the first direction. A first local maximum in the two dimensional motion vector histogram corresponds to the first motion vector 118 and a second local maximum in the two dimensional motion vector histogram corresponds to the second motion vector 120. The means 214 for calculating distances between pixels is optional but preferably the distance between pixels corresponding to groups of pixels is taken into account. This is especially of importance in the case that the two dimensional motion vector histogram comprises more than two local maximum values. It is also possible that not a motion vector corresponding with a local maximum is selected but a motion vector with values which are close to the values of motion vector corresponding with a local maximum.

FIG. 2D schematically shows an embodiment of the occlusion detector 205 comprising a measurement unit 218 to determine the first predetermined threshold. The first predetermined threshold and the second predetermined threshold are of influence of the sensitivity of the occlusion detector 205. Suppose that the motion vectors, being provided at the second input connector 208, are calculated based on luminance values of pixels and that the range of luminance values is between 0 and 255. Then the first predetermined threshold is also in the range of 0 to 255. If the first predetermined threshold is relatively low then the probability is high that pixels which are not located in an occlusion area 108, 110 are erroneously labeled as being located in an occlusion area 108, 110. At the other hand if the first predetermined threshold is relatively high then the probability is high that pixels which are located in an occlusion area are erroneously not labeled as being located in an occlusion area. By measuring e.g. the level of noise, or contrast or of the frequency characteristics of the image 100 an appropriate value of the first predetermined threshold can be derived. Similar, an appropriate value of the second predetermined threshold can be derived. The measurements can be based on the image 100 for which the occlusion areas 108, 110 have to be detected. It is also possible to perform these measurements on other images, e.g. 102. Calculating a standard deviation of pixel values or a Fast Fourier Transform can be applied to achieve the first and second predetermined threshold. The means 216 for calculating frequencies of occurrences and the means 214 for calculating distances between pixels are optional.

FIG. 2E schematically shows an embodiment of the occlusion detector 207 comprising a gap-closing filter 220. The output of the decision unit 204 is a binary mask, indicating for each pixel of the image 100, whether it belongs to an occlusion area, e.g. 108, or whether it does not belong to such an occlusion area. This binary masked is post-processed by the gap-closing filter 220. The gap-closing filter 220 works as follows. Pixels belonging to an occlusion area are valued 1 and pixels not belonging to an occlusion area are valued 0. The 1 valued pixels are retained by the gap-closing filter 220. The gap-closing filter 220 changes a "0-valued" pixel to "1" if in a region of interest with dimensions height, H and width, W, there are at least P pixels with value 1 on the right and on the left side of the "0-valued" pixel.

FIG. 3 schematically shows an embodiment of the motion estimator 300 according to the invention, comprising:

a motion vector estimator 302 for calculating a set of motion vectors for respective groups of pixels of an image, e.g. 100;

an occlusion detector 314 for detecting occlusion areas in the image 100 based on the set of motion vectors; and a motion vector assigning unit 304 for assigning a particular motion vector to a particular pixel 111, 112 on the basis of output of the occlusion detector 200, 201, 203, 205, 207.

The motion vector estimator 302 works e.g. as described in the article "True-Motion Estimation with 3-D Recursive Search Block Matching" by G. de Haan et. al. in IEEE Transactions on circuits and systems for video technology, vol. 3, no. 5, October 1993, pages 368-379. Other motion estimators are possible. The occlusion detector 314 works as described in connection with the FIGS. 2A, 2B, 2C, 2D, 2E, respectively. The motion vector assigning unit 304 comprises a Foreground/Background detector, e.g. as described in the document of the international patent application filed under the application number EP 0104647 or in the article "A novel algorithm for adaptive background estimation", by D. Gao, J. Zhou and L. Xin, in Proceedings ICIP 2001 pp. 395-398. The motion vector assigning unit 304 determines for pixels which are labeled as being part of an occlusion area 108, 110 whether they are located in a region 108 which will be covered in a next image 102 or whether they are located in a region 110 which will be uncovered in a next image 102. This corresponds with belonging to background or foreground, respectively. Depending on this latter type of classification the motion vector assigning unit 304 assigns a motion vector to the pixels which are labeled as being part of an occlusion area 108, 110. This can be e.g. the first motion vector 118 or the second motion vector 120. Notice that although it has been determined that the first motion vector 118 and the second motion vector 120 are incorrect, they can be appropriate for further processing. They are incorrect because they do not represent the actual physical event: something is replaced by something else. A motion vector is a representation of a movement of one and the same object. The first motion vector 118 or the second motion vector 120 can be appropriate because by applying one of these motion vectors a substantially correct re-timed pixel can be calculated, e.g. in the case of up-conversion.

FIG. 4 schematically shows elements of an image processing apparatus 400 comprising:

receiving means 401 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 407.

a motion estimator unit 300 as described in connection with FIG. 3;

a motion compensated image processing unit 403; and a display device 405 for displaying the processed images. This display device is optional.

The motion compensated image processing unit 403 requires images and motion vectors as its input.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. It is also possible that some functions are distributed over several means. E.g. there can be two pixel value comparators instead of one.

The invention claimed is:

1. An occlusion detector for detecting occlusion areas in a first image based on a set of motion vectors, with the first image belonging to a series of consecutive images, wherein the occlusion detector comprises:

a motion vector selector for selecting a first motion vector and a second motion vector from the set of motion vectors, based on a substantial vector difference between the first motion vector and the second motion vector;

a pixel value comparator for calculating a first pixel value difference between a first luminance value of a first pixel of a second image and a second luminance value of a second pixel of a third image, with a first relation between the first pixel and the second pixel given by the first motion vector, and for calculating a second pixel value difference between a third luminance value of a third pixel of the second image and a fourth luminance value of a fourth pixel of the third image, with a second relation between the third pixel and the fourth pixel given by the second motion vector; and a decision unit for deciding whether a particular pixel of the first image, corresponding to an intersection of the first motion vector and the second motion vector, belongs to one of the occlusion areas by checking whether the first pixel value difference is larger than a first predetermined threshold and the second pixel value difference is larger than a second predetermined threshold.

2. An occlusion detector as claimed in claim 1, wherein the motion vector selector is designed to select the first motion vector based on a distance between the particular pixel and a further pixel that belongs to a particular group of pixels to which the first motion vector corresponds.

3. An occlusion detector as claimed in claim 1, wherein the motion vector selector is designed to determine frequencies of occurrence for motion vectors of the set of motion vectors and to select the first motion vector on the basis of the frequencies of the occurrence.

4. An occlusion detector as claimed in claim 1, wherein the pixel value comparator is designed to calculate an absolute difference between the first value and the second value.

5. An occlusion detector as claimed in claim 1, wherein the motion vector selector is designed to select the first motion vector from the set of motion vectors, with the set comprising motion vectors estimated for respective groups of pixels of the first image and the third image.

6. An occlusion detector as claimed in claim 1, wherein the occlusion detector comprises a measurement unit to determine the first predetermined threshold.

7. A method of detecting occlusion areas in a first image based on a set of motion vectors, with the first image belonging to a series of consecutive images wherein the method comprises:

selecting a first motion vector and a second motion vector from the set of motion vectors, based on a substantial vector difference between the first motion vector and the second motion vector;

calculating a first pixel value difference between a first luminance value of a first pixel of a second image and a second luminance value of a second pixel of a third image, with a first relation between the first pixel and the second pixel given by the first motion vector, and for calculating a second pixel value difference between a third luminance value of a third pixel of the second image and a fourth luminance value of a fourth pixel of the third image, with a second relation between the third pixel and the fourth pixel given by the second motion vector; and deciding whether a particular pixel of the first image, corresponding to an intersection of the first motion vector and the second motion vector, belongs to one of the occlusion areas by checking whether the first pixel value difference is larger than a first predetermined threshold and the second pixel value difference is larger than a second predetermined threshold.

8. A motion estimator comprising:

a motion vector estimator for calculating a set of motion vectors;

an occlusion detector for detecting occlusion areas in a first image based on the set of motion vectors; and a motion vector assigning unit for assigning a particular motion vector to a particular pixel on the basis of output of the occlusion detector, wherein the occlusion detector comprises:

a motion vector selector for selecting a first motion vector and a second motion vector from the set of motion vectors, based on a substantial vector difference between the first motion vector and the second motion vector;

a pixel value comparator for calculating a first pixel value difference between a first luminance value of a first pixel of a second image and a second luminance value of a second pixel of a third image, with a first relation between the first pixel and the second pixel given by the first motion vector, and for calculating a second pixel value difference between a third luminance value of a third pixel of the second image and a fourth luminance value of a fourth pixel of the third image, with a second relation between the third pixel and the fourth pixel given by the second motion vector; and a decision unit for deciding whether a particular pixel of the first image, corresponding to an intersection of the first motion vector and the second motion vector belongs to one of the occlusion areas by checking whether the first pixel value difference is larger than a first predetermined threshold and the second pixel value difference is larger than a second predetermined threshold.

9. An image processing apparatus comprising:

receiving means for receiving a signal representing a first image to be displayed;

a motion estimator comprising an occlusion detector for detecting occlusion areas in the first image based on a set of motion vectors, with the first image belonging to a series of consecutive images; and a motion compensated image processing unit wherein the occlusion detector comprises:

a motion vector selector for selecting a first motion vector and a second motion vector from the set of motion vectors, based on a substantial vector difference between the first motion vector and the second motion vector;

a pixel value comparator for calculating a first pixel value difference between a first luminance value of a first pixel of a second image and a second luminance value of a second pixel of a third image, with a first relation between the first pixel and the second pixel given by the first motion vector, and for calculating a second pixel value difference between a third luminance value of a third pixel of the second image and a fourth luminance value of a fourth pixel of the third image, with a second relation between the third pixel and the fourth pixel given by the second motion vector; and a decision unit for deciding whether a particular pixel of the first image, corresponding to an intersection of the first motion vector and the second motion vector, belongs to one of the occlusion areas by checking whether the first pixel value difference is larger than a first predetermined threshold and the second pixel value difference is larger than a second predetermined threshold.

* * * * *